(12) United States Patent
Conte et al.

(10) Patent No.: US 11,544,990 B2
(45) Date of Patent: Jan. 3, 2023

(54) METHOD AND DEVICE FOR A DISPLAY AIMED TO AN EMOTIONAL INVOLVEMENT IN GAMES WHICH PROVIDE FOR PERFORMING BETS

(71) Applicant: JJ Gaming S.R.L., San Salvatore Monferrato (IT)

(72) Inventors: Pierangelo Conte, San Salvatore Monferrato (IT); Christian Toini, San Salvatore Monferrato (IT); Bruno Toini, San Salvatore Monferrato (IT); Serena Corbellini, San Salvatore Monferrato (IT)

(73) Assignee: JJ Gaming S.R.L., San Salvatore Monferrato (IT)

( * ) Notice: Subject to any disclaimer, the term of this patent is extended or adjusted under 35 U.S.C. 154(b) by 112 days.

(21) Appl. No.: 17/274,334

(22) PCT Filed: Sep. 11, 2019

(86) PCT No.: PCT/IT2019/000072
§ 371 (c)(1),
(2) Date: Mar. 8, 2021

(87) PCT Pub. No.: WO2020/058999
PCT Pub. Date: Mar. 26, 2020

(65) Prior Publication Data
US 2021/0343106 A1    Nov. 4, 2021

(51) Int. Cl.
*G07F 17/32* (2006.01)
*G06F 3/14* (2006.01)
*G06T 5/00* (2006.01)
*G09G 3/00* (2006.01)
*H04N 5/225* (2006.01)
*H04R 1/32* (2006.01)
*A63F 5/00* (2006.01)
*A63F 9/24* (2006.01)

(52) U.S. Cl.
CPC ........ *G07F 17/3211* (2013.01); *G06F 3/1423* (2013.01); *G06T 5/006* (2013.01); *G07F 17/322* (2013.01); *G09G 3/001* (2013.01); *H04N 5/225* (2013.01); *H04R 1/326* (2013.01)

(58) Field of Classification Search
CPC ....... G06F 3/1423; G06T 5/006; G09G 3/001; H04N 5/225; H04R 1/326; A63F 2009/2432; A63F 2009/2442; A63F 2009/2461; A63F 5/00
See application file for complete search history.

(56) References Cited

U.S. PATENT DOCUMENTS

2014/0148251 A1*  5/2014  Nordahl .............. G07F 17/3272
463/31

FOREIGN PATENT DOCUMENTS

EP    2469489    6/2012

* cited by examiner

*Primary Examiner* — Robert T Clarke, Jr.
(74) *Attorney, Agent, or Firm* — Macheledt Bales LLP; Jennifer L. Bales (57) ABSTRACT

A method and a device for increasing the emotional involvement in games which provide for performing bets, wherein the result of the bets is determined by the occurrence of an event such as the output of a winning number. The method detects instant by instant the position of a small ball and represents the movement on a bets placement area. The device determines the winning number, performs bets, monitors the run of the small ball, and displays its trajectory on the betting platform.

19 Claims, 8 Drawing Sheets

Fig. 8

METHOD AND DEVICE FOR A DISPLAY AIMED TO AN EMOTIONAL INVOLVEMENT IN GAMES WHICH PROVIDE FOR PERFORMING BETS

BACKGROUND OF THE INVENTION

1 Field of the Invention

The present invention refers to a method for increasing the emotional involvement of people participating in games, which provide for performing bets, and to a game device, of the roulette type, for performing this method. This method is also useful for improving the control of the regularity of the game.

The game device is equipped with means designed to detect the movement of a small ball inside a cylinder of the roulette and represent the same small ball outside the cylinder displaying it inside a bets placement area, on which there are the numbers as arranged in the cylinder. The term "bets placement area" means the real (game carpet) or virtual (screen or the like) place wherein the bets on the numbers are placed.

According to a preferred embodiment, the invention refers in particular to a transformation kit to be applied to pre-existing cylinders, the transformation occurring with minimum or null activities for adapting the pre-existing cylinder.

2 Background Art

The game devices of the roulette type comprise a cylinder, inside which an operator (croupier) slides a small ball, and a bets placement area, designed to receive the bets of the players, on which there are the cylinder numbers arranged in an increasing order from number 0 to number 36. The cylinder and the bets placement area are usually both placed on a table, so that, under the careful eye of the croupier, the players can place their bets.

A first problem which can be found under these situations is that it is impossible to simultaneously monitor the bets placement area and the area wherein the final event occurs which determines the winning number. This fact prevents a player from immediately perceiving whether his bet was winning. This is relevant because it reduces his emotional involvement, also taking care that the players are seated near the bets placement area, therefore not in an ideal position to check the cylinder which is at an end of the table, where there is only the croupier.

Such problem results in the incapability of the cylinder operator to efficiently perform its control activity about the regularity of the game. In particular, the operator must check that no bets are placed starting from the so-called declaration of "no more bets". In fact, at that time the small ball is about to fall in a numbered box and the winning number is therefore foreseeable.

The operator must also check that, after the small ball has ended its run and is consequently about to fall in the winning number, no new bets are fraudulently placed, while his look is towards inside the cylinder.

Moreover, the operator, after having seen the winning number in the cylinder, must manually point it out on the bets placement area, to then remove the non-winning bets. This operation is subjected to reading errors of the number by the operator and it is also possible that, after a correct reading of the number, a different number is pointed out by mistake on the bets placement area. Both the first and the second possibility result in the removal of winning bets and, once having detected the error, in their problematic reconstruction, with consequent losses of time.

A further problem which occurs in the roulette game stems from the fact that the numbers in the cylinder are arranged differently with respect to the grid of numbers placed inside the bets placement area. This fact implies a further division between the place where a player operates, namely the bets placement area, and the place where the result is formed, namely the cylinder, limiting the player's emotional involvement.

The roulette game can also be played with automatic electronic machines, where the real cylinder is replaced by a virtual image of the cylinder itself. In this case, there are no control problems for the regularity of the game, however, there are margins for increasing the emotional involvement of the players, and moreover there remain the other problems connected to the division between the place in which the result is checked (cylinder) and the bets placement area. In this area, there are roulette machines and virtual roulettes on a PC screen or slot.

SUMMARY OF THE INVENTION

Object of the present invention is solving the above prior art problems by providing a method, and a device for performing the method, respectively as claimed in claims 1 and 5.

Preferred embodiments and non-trivial variations of the present invention are the subject matter of the dependent claims.

The method is designed to increase the emotional and immersive involvement of people participating to games, which provide for performing bets, wherein the result of the bets is determined by the occurrence of an event, such as the end of the run of a small real or virtual ball in a box of a roulette cylinder, thereby determining a winning number, the roulette being also real or virtual.

According to a preferred embodiment, the method of the invention provides that the graphics of the bets placement area reproduce that of the cylinder, so that there is a direct correspondence with the numbers included on a rotating disk of the roulette cylinder.

According to a further preferred embodiment, the symbols of the numbers included in the bets placement area are unmoving and the image of the small ball appears moving with respect to the numbers, the movement going on in time until the small ball falls into the box, decreeing the winning number.

Synthetically, the method provides for unifying the place where the small ball is seen rotating, and therefore there occurs the final event, and the place where bets are placed.

The game device for performing the method is of the type comprising:
first means designed to determine an event, such as the end of the run of a small ball into a box of a roulette cylinder, thereby determining a winning number;
second means designed to allow performing bets;
third means designed to monitor the run of the small ball, till the end of the run in a box of the roulette cylinder;
fourth processing means, designed to process the output of the third means;
fifth displaying means designed to represent on the second means, the trajectory of the small ball and display it till the winning number is determined.

Observing the bets placement area, on which the image of the moving small ball is projected, it is as operator and user simultaneously see both the cylinder and the bets placement area. In this way, operator and/or user must not observe any more an interior of the cylinder to locate the winning number and, only afterwards, move their look towards the bets placement area, but they simultaneously perceive result and winning bet. Consequently, for the operator the efficiency of the control of the regularity of the game increases, making practically impossible to place bets after the fall of the small ball, while for the user the emotional involvement and its perception of the final result being produced increase.

Moreover, the operator can safely locate the winning number, and thereby both cleaning the carpet of bets resulted as losing, and paying the winning bets, are made easier.

The advantages for player users are a greater emotional involvement, due to the fact of seeing the small ball rotate, move near their own bets and then stop on one of the bets, immediately knowing the result of his bet.

Such involvement is given by the alternate positive and negative emotions given by the passage of the small ball next both to the numbers on which the player has bet, and to those on which no bets have been placed, the emotions being as more intense as more the small ball slows down, to then result in the number which decrees a win or a loss.

The fact of providing for a graphics of the bets placement area which faithfully reproduces that of the cylinder has the effect of a greater involvement of the players, in addition to allow bets which are currently not possible due to this positioning difference of the numbers between cylinder and bets placement area. For example, the efficiency of one's own bets is improved, since it is possible to bet on two nearby numbers in the cylinder with a single bet.

According to another preferred embodiment, the present invention allows projecting, namely differently representing on the bets placement area, other games or game options, whose result is directly or indirectly assignable to the result of the main game, for example winning multipliers or meaningful symbols (for example of the game cards) or of the images, determining a further result with respect to the winning number only.

According to another preferred embodiment, it is provided to house a directional microphone, which allows detecting the sounds of the small ball inside the cylinder. Listening through an audio diffusor the sound produced by the run of the small ball, together with observing the image of the moving small ball itself on the bets placement area has the effect of further increasing the involvement of the players.

The invention can be easily applied to pre-existing cylinders. This can be obtained with the simple application of a kit to be externally applied to the cylinder, without having to perform any modification to the cylinder itself, or with a modification kit to be applied both externally and internally to a central pin/rod of the cylinder.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as appears from the enclosed claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

Figure 1:
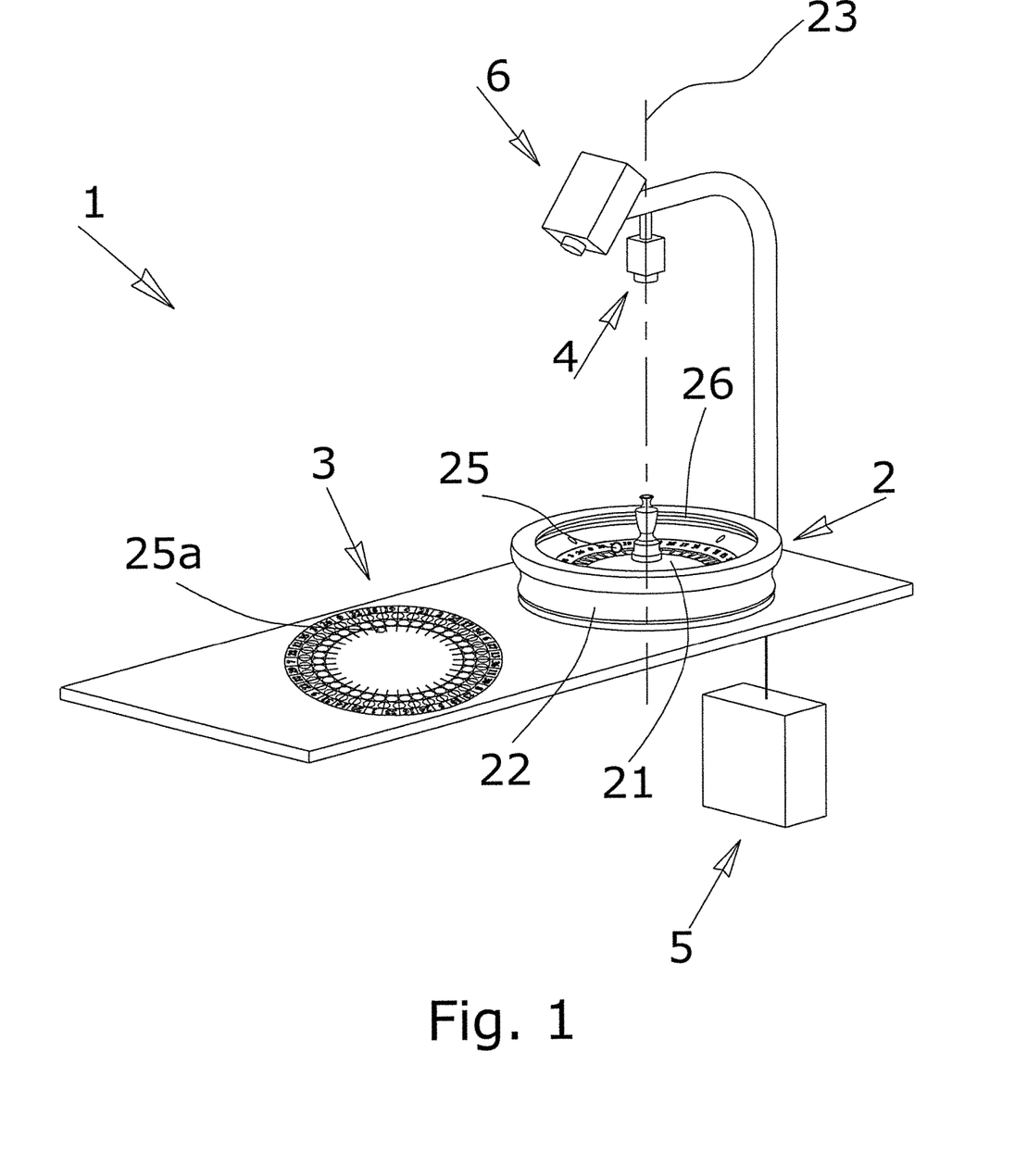
FIG. 1 shows a game device according to the invention.
Figure 2:
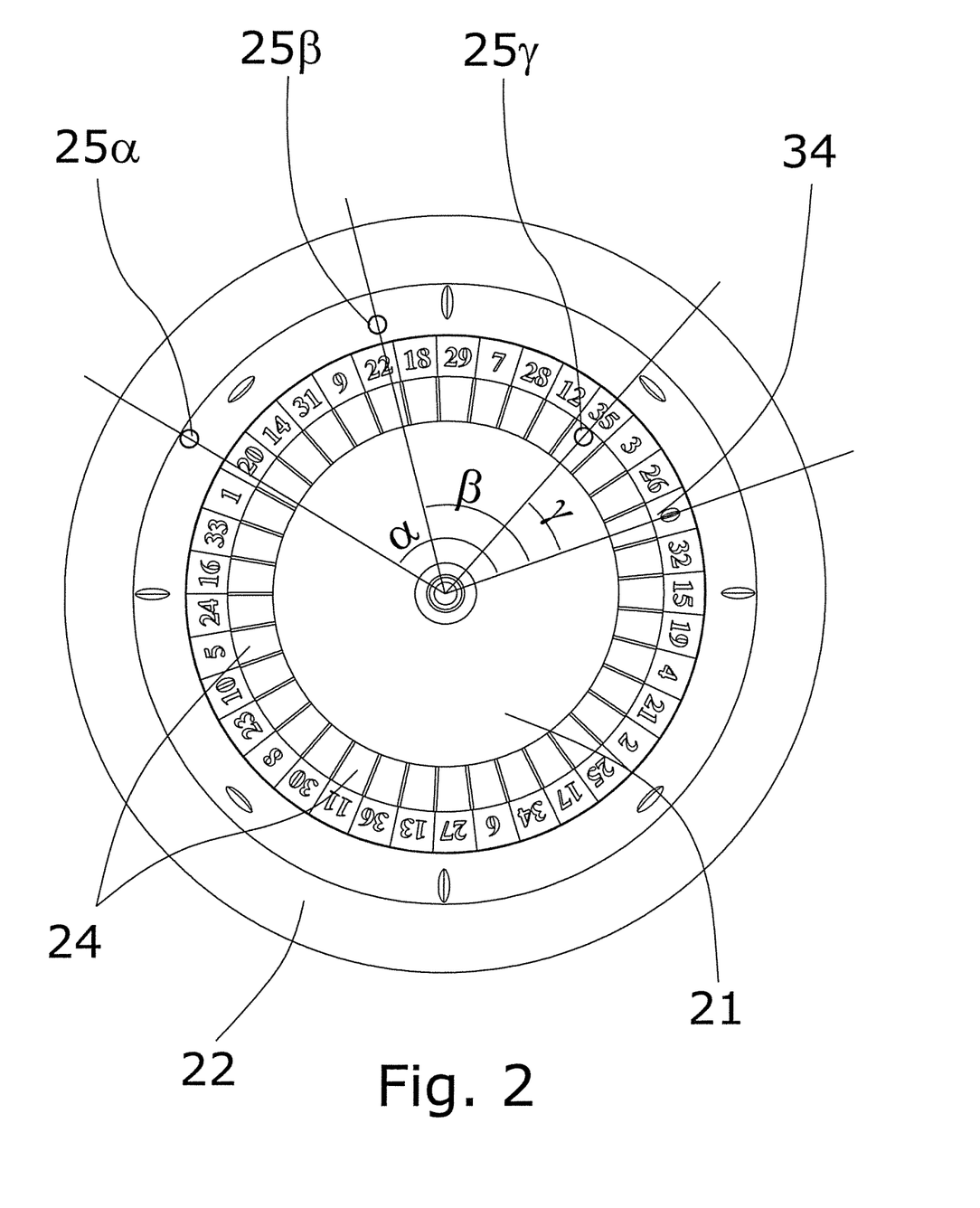
FIG. 2 shows the means designed to determine the winning number (cylinder roulette) seen from the optical system.
Figure 3:
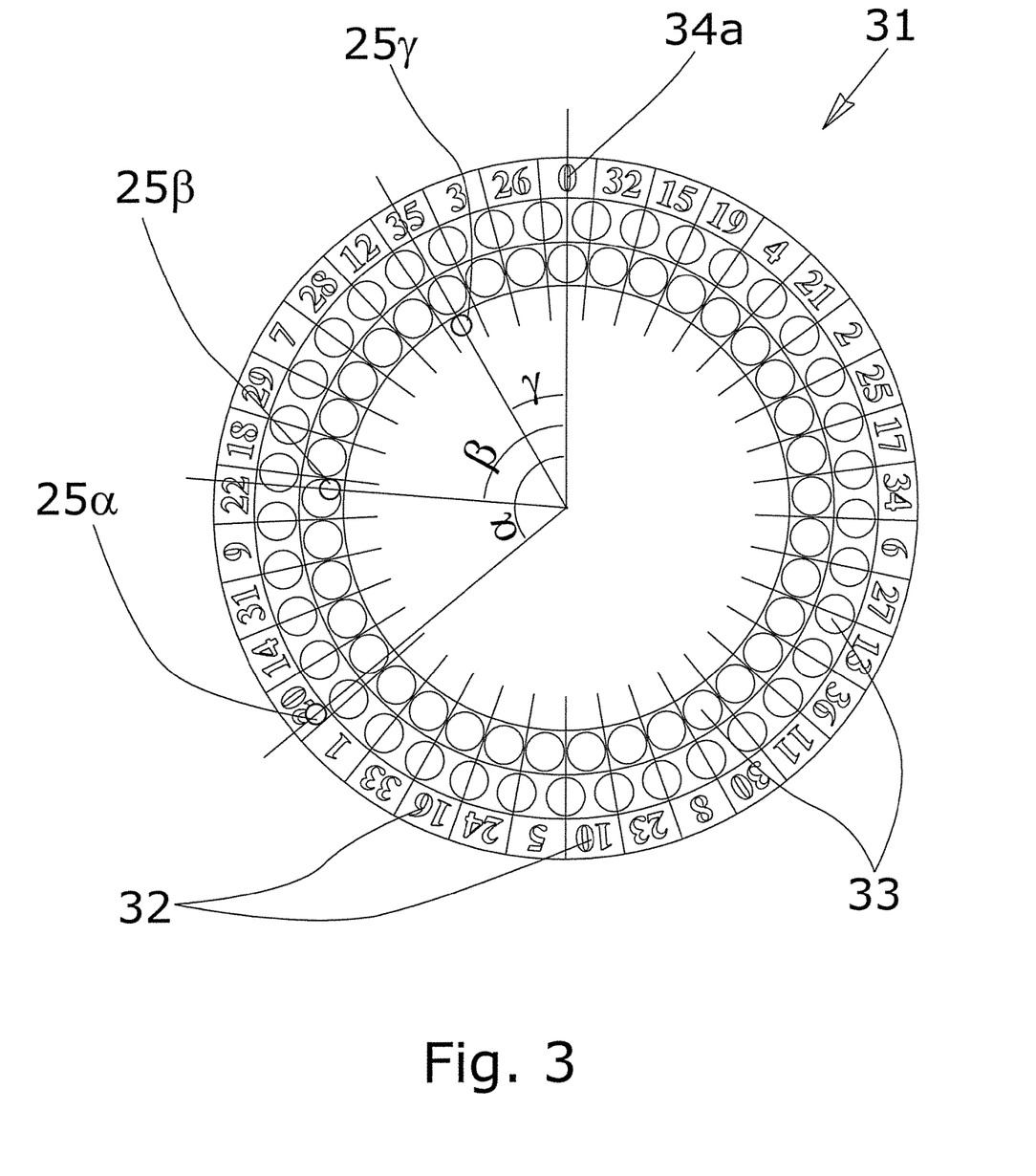
FIG. 3 shows a bets placement area.

With reference to FIGS. 1, 2 and 3, (1) designates a game device according to the invention.

According to a preferred embodiment, the game device (1) comprises:
   first means designed to determine a winning number, for example a roulette cylinder (2);
   second means designed to allow performing bets, for example a bets placement area (3);
   third means designed to monitor the mode for determining the winning number, for example shooting means (4) designed to shoot the run of a small ball (25) inside the roulette cylinder (2);
   fourth processing means, for example an electronic processor (5), designed to process the image shot by the third shooting means (4);
   fifth displaying means, for example a projector (6), designed to represent on the bets placement area (3), an image (25a) of the small ball (25) shot by the third shooting means (4).

The fifth displaying means (6) can be used to project other images, always processed by the fourth processing means (5), related to variations of the game or options of the game itself, which can be both directly and indirectly attributed to the result of the main game, for example winning multipliers or meaningful symbols (for example of the game cards) or of the images, determining a further result with respect to the winning number only.

According to a preferred embodiment, the roulette cylinder (2) comprises a central rotating disk (21) which rotates, around an axis pin (23), inside a fixed part (22).

The central rotating disk (21) is equipped with a plurality of numbered boxes (24) designed to receive the small ball (25) so that, by placing the small ball (25) on a track (26) and launching it towards the rotating disk (21), the small ball (25) ends its run in one of the numbered boxes (24).

In order to allow bets from the players, on the bets placement area (3) there is an image (31) which represents the rotating disk (21), reproducing its shape.

Preferably, along the circumference of the image (31), a numbering (32) is included, which corresponds to that of the numbered boxes (24) present on the rotating disk (21). The image (31) further comprises small areas (33), placed next to the numbering (32), on which the bets performed by the players are placed.

The shooting means (4) comprise a camera placed above the cylinder (2) preferably with the optical axis aligned with the rotation axis (23) of the central rotating disk (21). FIG. 2 shows the image of the cylinder as seen by the camera (4) and various positions (25α, 25β, 25γ) of the small ball (25) in some phases of its run, designated by angles α, β and γ, which measure the angular distance of the small ball (25) from number "zero" (34).

For every image coming from the camera (4), a search is provided, through a processor (5) and a suitable software, for the box with number "zero" (34), then the same image is rotated with respect to the centre of the circumference of the numbers (24), to take the "zero" (34) on the top, in order to replicate the position of the "zero" (34a) and of all the remaining numbers (32) in the bets placement area (3), as shown in FIG. 3.

After a continuous rotation of the disk (21), the camera (4) send to the processor (5) a sequence of images which, after processing, will be returned with number "0" (34) on the top, in a zero degrees position.

Inside the cylinder (2), the rotating disk (21) rotates around its own axis (23) and the small ball (25) runs first along the internal circumference of the cylinder (2) itself, then follows an extremely irregular trajectory, jumping on the obstacles which it meets and bouncing on the edges of the numbered boxes (24), till it ends its run in one of the numbered boxes (24).

Upon every image captured by the camera (4), the small ball (25), launched inside the cylinder (2), will be in a different position. As an example, when the small ball in the rotating disk (21) is in position (25α), as shown in FIG. 2, there will be an angle (α) between the position of the small ball and the centre of number "zero" (34).

FIG. 3 shows the position (25α) of the small ball (25), displayed through the projector (6) on the image (31), which represents the rotating disk (21), on the bets placement area (3). The position (25α) is obtained by keeping the same angle (α), with respect to "zero" (34a), in the numbering (32) of the image (31).

Thus, in the following, when the small ball (25) on the rotating disk (21) is in position (25β), there will be an angle (β) between the position of the small ball (25) and that of number "zero" (34), with respect to the rotation axis (23).

FIG. 3 shows the new position (25β) of the small ball (25), always displayed through the projector (6), position given by keeping the same angle (β) with respect to "zero" (34a) of the numbering (32) of the image (31).

The position of the small ball (25) seen by the camera (4) will in turn (image after image) be corrected so that, through the projector (6), the trajectory projected on the bets placement area (3) is equal to the one actually run by the small ball inside the cylinder (2).

At the end of its run, the small ball (25) will be in a position (25γ) inside one of the numbered boxes (24), as shown in FIG. 2. Obviously, the position (25γ) on the grid of the numbers (32) (FIG. 3), included on the bets placement area (3), will be next to the number which locatexs the box (24) where the small ball (25) has ended its run.

According to a preferred embodiment, the camera (4) is equipped with means designed to allow a rotation of the camera (4) itself integrally with the rotating disk (21). In this case, the following image straightening is not necessary.

Figure 4:
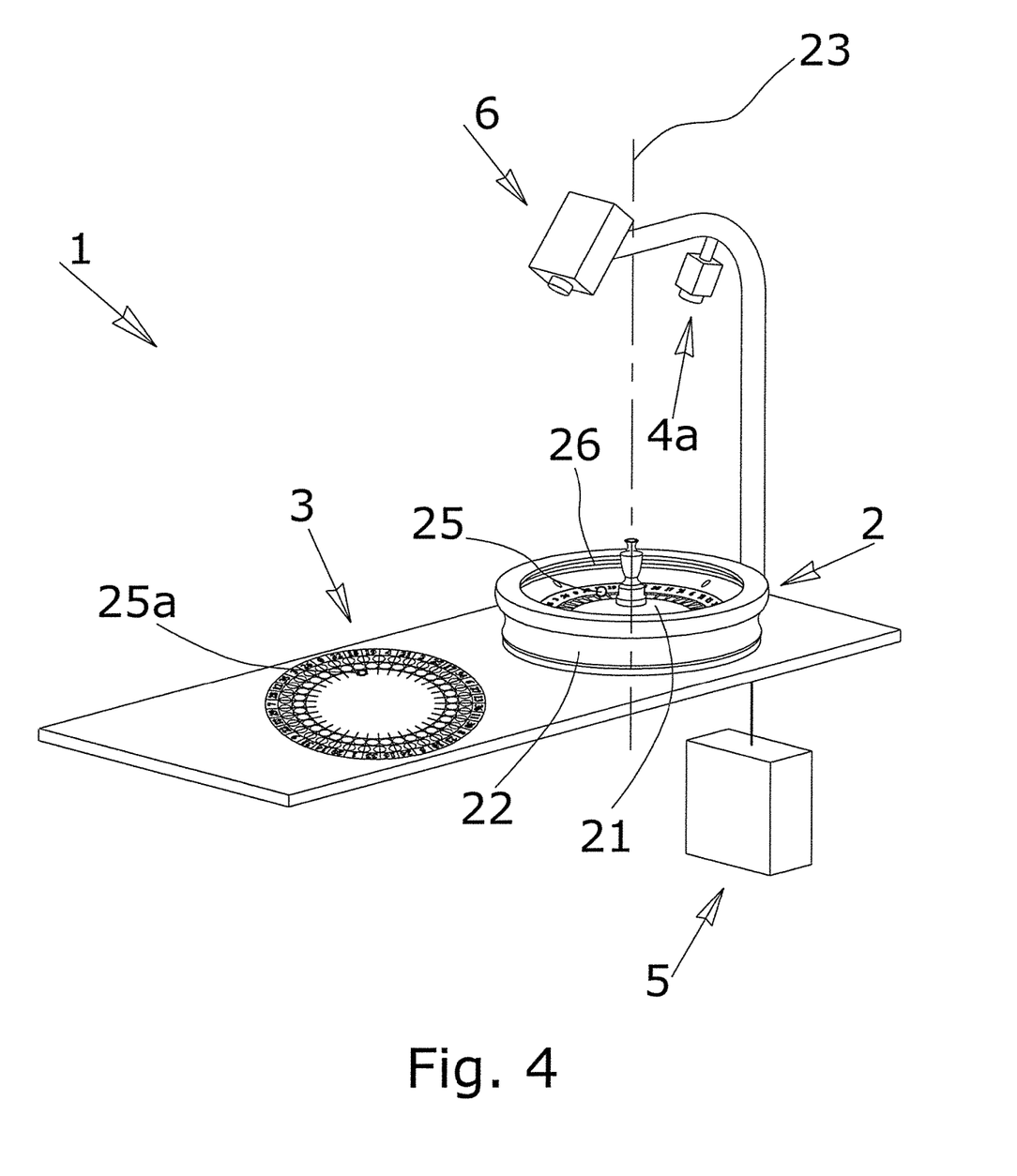
FIGS. 4-5-6-7 show variations of the game device of the invention.

FIG. 4 shows a variation of the invention where the shooting means comprise a camera (4a) placed above the cylinder (2), but in a lateral position with respect to the rotation axis (23) of the rotating disk (21). In this case, a suitable processing of the images is necessary, to enable the image received by the camera (4a) to appear as if it was shot by a camera with its optical axis aligned with the rotation axis (23) of the central rotating disk (21). The processing is performed by the processing means (5).

Figure 5:
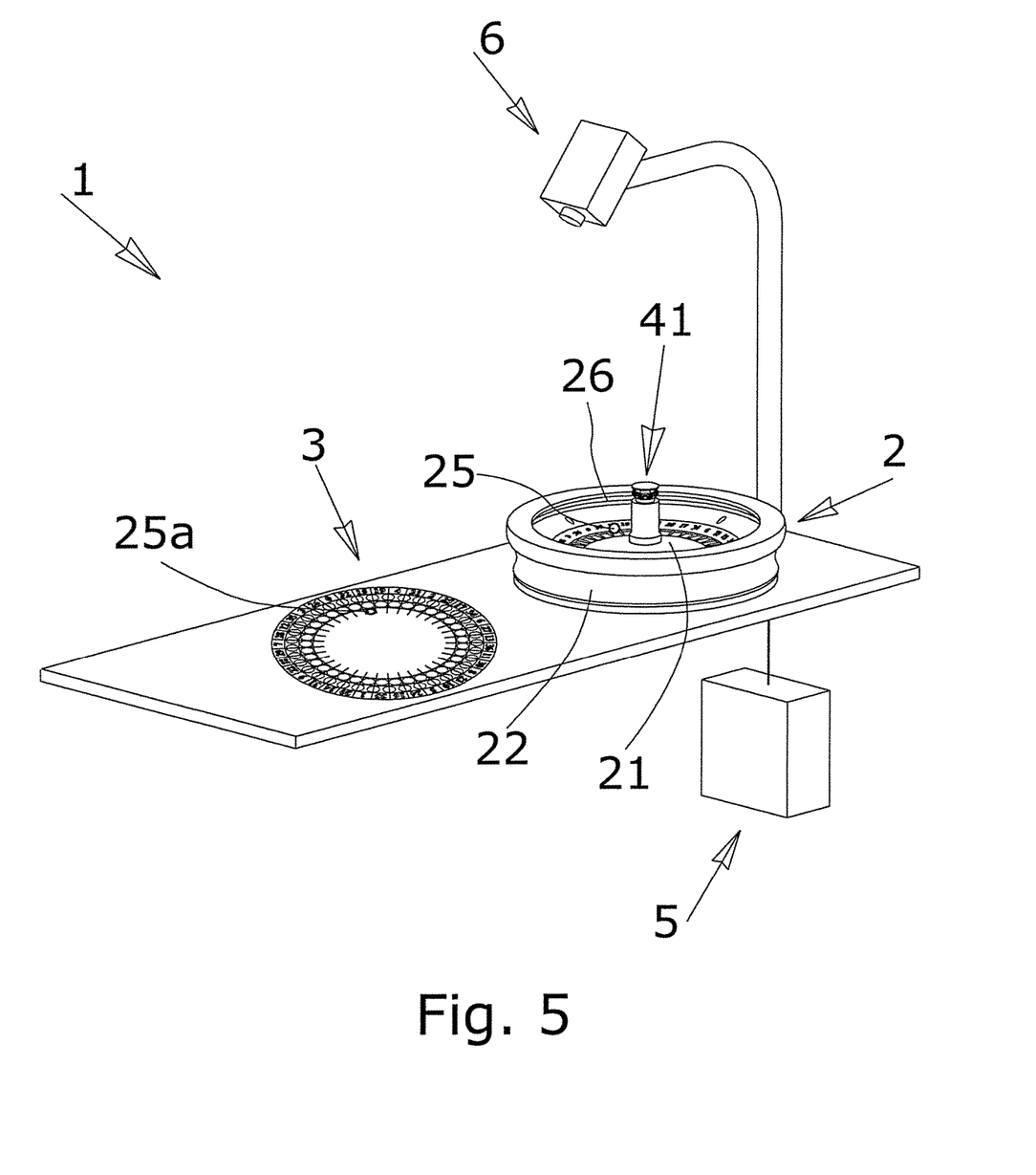
Figure 6:
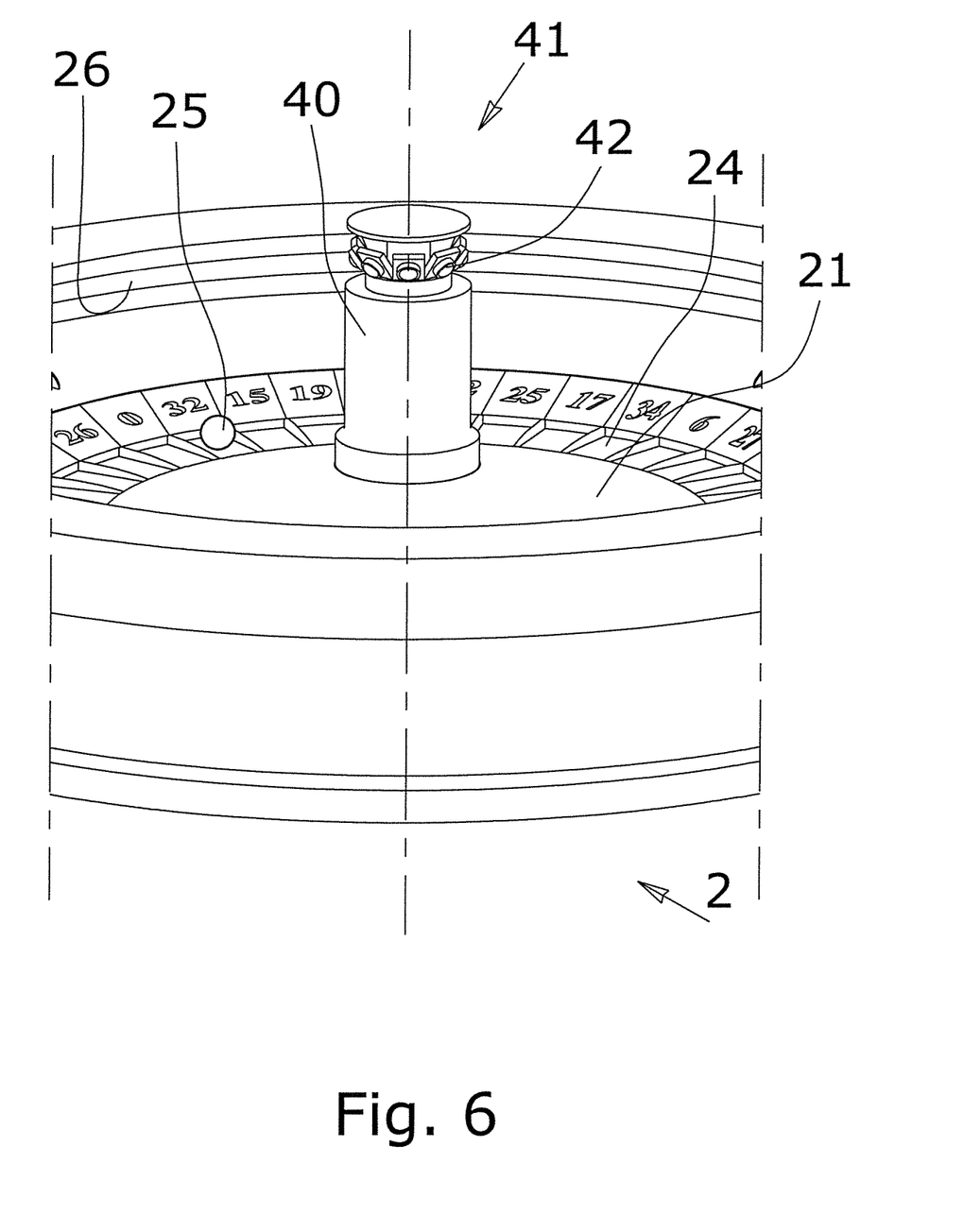

According to another preferred embodiment, shown in FIG. 5, the shooting means designed to shoot an interior of the rotating disk (21) comprise an optical system (41), better visible in FIG. 6, which provides for the use of a plurality of cameras (42), radially oriented so that each one of them covers a sector of the cylinder (2). The optical system (41) is assembled on a turret (40) of the rotating disk (21) and therefore rotates integrally with the rotating disk (21). Obviously, the cameras (42) will have to be in an enough number to cover the whole game volume.

The cameras (42) are connected to the processing means (5), of a known type, designed to process the images shot by the cameras (42), in order to correct the image distortions, due to the particular shooting of the interior of the cylinder (2) by the cameras (42).

Moreover, the cameras (42) will have in an enough number to avoid excessive distortions to shot images, in order to make fully efficient the image treatment by the processing means (5). The thereby acquired images are used for determining the position of the small ball (25) and, through the projector (6), displaying the image (25a) of the small ball (25) in the bets placement area (3).

Figure 7:
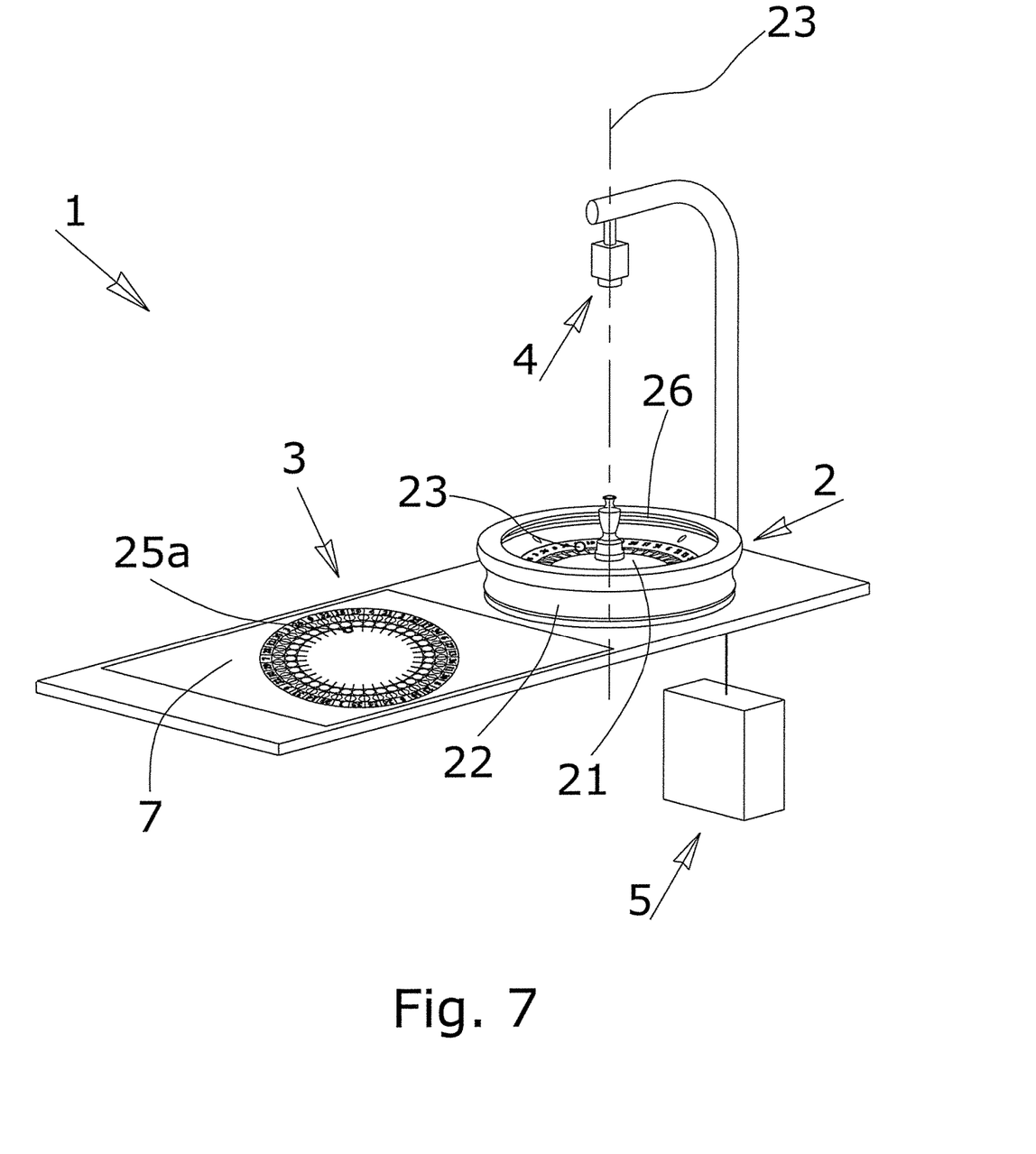

FIG. 7 show a variation of the invention, where the displaying means (6) comprise a surface (display or backlit panel) (7) designed to display the image which is directly transmitted by the processing means (5).

In the variation, the image (31) which represents the rotating disk (21) is printed on a transparent or semi-transparent material (for example plastics, fabric) placed above the surface (7), so that the trajectory of the image (25a) of the small ball (25) on the surface (7) is visible by players.

The invention, as shown in FIGS. 1 to 7, comprises only components to be installed outside the cylinder (2) without having to perform any modification to the cylinder (2) itself. It can therefore be actuated through the supply of a first modification kit comprising only the additional components, namely the:

second means designed to allow performing bets, namely the bets placement area (3) which substantially reproduces the graphics of the rotating disk (21);

third means designed to monitor the mode for determining the winning number, for example the shooting means (4, 4a, 41), designed to shoot the run of the small ball (25) inside the roulette cylinder (2);

fourth processing means, for example the electronic processor (5), designed to process the image shot by the shooting means (4);

fifth displaying means, for example the projector (6) or the display or backlit panel (7), designed to represent on the bets placement area (3), the image (25a) of the small ball (25) shot by the shooting means (4, 4a, 41).

According to another preferred embodiment, not shown, the third means designed to monitor the mode for determining the winning number comprise a plurality of sensors placed on the circumference of the cylinder (2), an encoder and the fourth processing means (5), equipped with a software designed to process the signal emitted by the sensors to determine the angular distance of the small ball (25) from number "zero" (34) and the linear distance from the centre of the rotating disk (21).

The display of the image (25a) can be performed by using the fifth displaying means (6, 7).

The sensors can advantageously be of the type with ultrasounds or laser, according to a known technology, and can be 360, namely one for each degree.

According to this embodiment, a second modification kit is provided, where the third shooting means comprise the sensors and the encoder, the fourth processing means (5) being designed to process the signal emitted by the sensors and the encoder.

Figure 8:
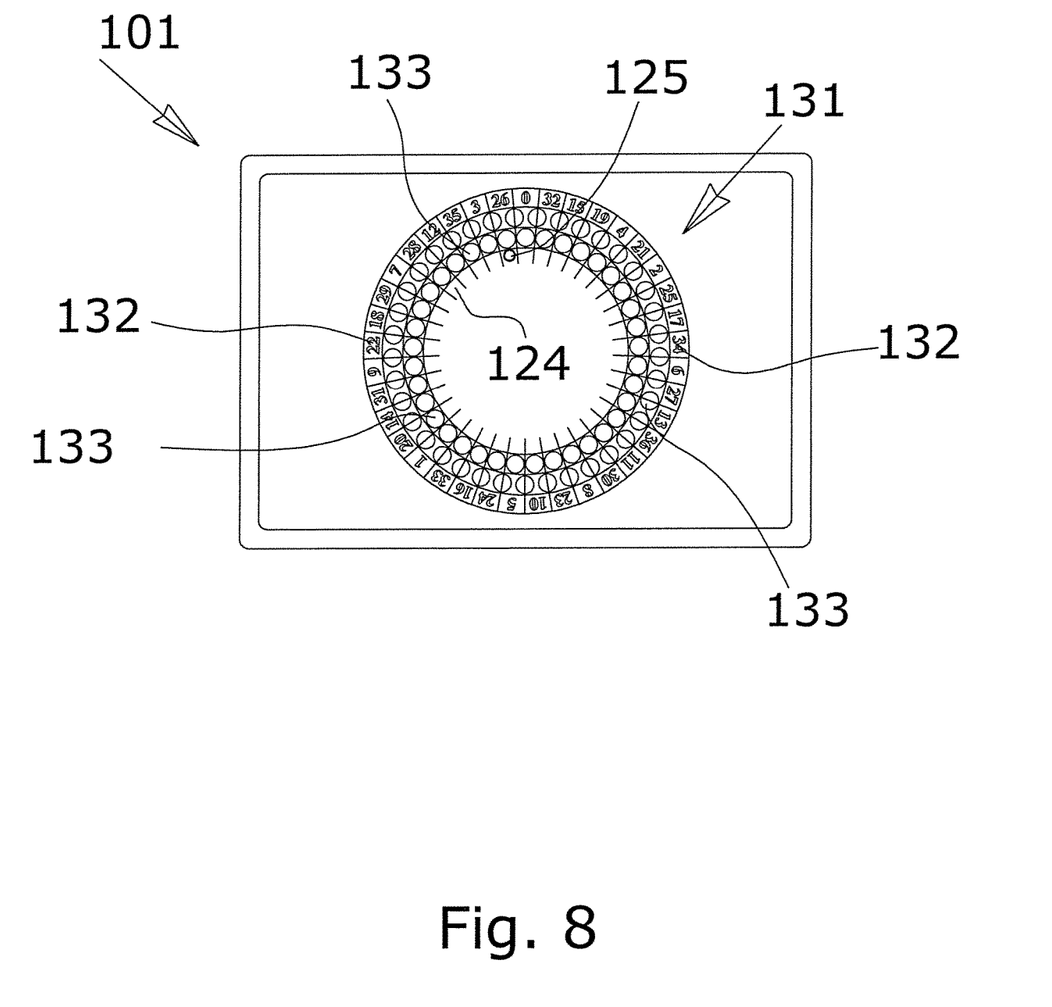
FIG. 8 shows a variation of the invention for a remote game.

Another preferred embodiment of the invention is the one shown in FIG. 8, where the bets placement area is composed of a remote screen (101). Also in this case, the images coming from the processing means (5) allow displaying on the device (101) the trajectory of a small ball (125). The device (101) also composes the bets placement area on which an image (131) is displayed, which represents the rotating disk (21), reproducing its shape. Also in this case, the images coming from the processing means (5) allow displaying on the device (101) the trajectory of the small ball (125).

The image (131) comprises a distribution of numbers (132), a distribution of small areas (133) and a series of boxes (124) inside which the small ball (125) ends its run. The small areas (133) through a screen pressure or keying-in on a keyboard, receive the player's bets.

The game device shown in FIG. 8 is of a different nature with respect to the one shown in FIGS. 1 to 7. In particular, the screen (101) can simply be a way of making the bets placement area (3) remotely from the roulette cylinder (2), but, equipped with a suitable electronics of a known type, can be deemed a roulette cylinder it self, in addition to suitable means to monitor the run of the small ball (125), to process detected data and to display the trajectory of the small ball (125). Obviously, in this case it is a wholly virtual roulette.

The embodiment shown in FIG. 8 can be performed by using smart-phones, tablets and computers, in addition to suitably manufactured equipment for the game or adapted thereto (for example, slot-machines, totems, multi-stations) which allow placing bets through touch-screen, but also through keyboards.

It is also possible to display the trajectory of the small ball (125) with data coming from processors without any relationship with real data confirmed by the movement of the small ball in a real cylinder (2). In this case, the small ball (125) and its trajectory are wholly virtual and the virtual betting area (131) performs the functions of the real cylinder (2).

According to another preferred embodiment of the invention, the display could occur, in addition to the bets placement area, also or only on a screw (not shown) of the type used for communicating to players/users some information about the game results.

What is claimed is:

1. Method for increasing the emotional and immersive involvement of people participating in games which provide for performing bets, wherein a result of the bets is determined by an occurrence of an event, namely an end of a run of a ball, in one of plurality of numbered boxes of a roulette cylinder, thereby determining a winning number, the method comprising the steps of:
   detecting instant by instant the position of the ball, from a launch of the ball inside the cylinder till the end of its run in one of the numbered boxes; and
   representing the movement of the ball by projecting an image of the ball on a bets placement area on which numbers associated with the numbered boxes of the roulette cylinder are included.

2. Method according to claim 1,
   wherein the numbers on the bets placement area are unmoving while the image of the ball moves with respect to the numbers on the bets placement area, the movement of the image of the ball continuing until the ball ends its run.

3. Method according to claim 1, wherein the bets placement area includes an image of the roulette cylinder, configured so that there is a direct correspondence between the numbers of the roulette cylinder image and the numbered boxes of the roulette cylinder.

4. Method according to claim 1,
   further including the step of providing a directional microphone and the step of detecting the sounds of the ball inside the cylinder with the directional microphone.

5. The method of claim 1 wherein the roulette cylinder, the numbered boxes, and the ball are virtual.

6. The method of claim 1, wherein the roulette cylinder, the numbered boxes, and the ball are physically real.

7. Game device comprising:
   first means configured to determine an event, namely a location of an end of a run of a ball in a numbered box of a roulette cylinder, thereby determining a winning number;
   second means configured to allow performing bets;
   third means configured to monitor the run of the ball till the end of the run;
   fourth processing means configured to process output of the third means to determine a trajectory of the ball;
   fifth displaying means configured to display on the second means the trajectory of the ball till the winning number is determined;
   characterized in that:
   the second means comprises a bets placement area, on which an image is included which represents the roulette cylinder; and
   the fifth displaying means comprises a projector connected with the fourth processing means, and configured to project an image of the ball on the bets placement area.

8. Game device according to claim 7, characterized in that:
   the first means comprises a rotating disk within the roulette cylinder;
   the third means comprises a camera configured to shoot an interior of the cylinder while following the movement of the ball;
   the fourth processing means further comprises means for correcting possible image distortions that would otherwise be displayed by the fifth displaying means.

9. Game device according to claim 8, characterized in that the camera is placed above the cylinder.

10. Game device according to claim 9, characterized in that the camera is placed with its optical axis aligned with a rotation axis of a central rotating disk of the cylinder.

11. Game device according to claim 10, characterized in that it has means to rotate the camera integrally with the rotating disk.

12. Game device according to claim 8, characterized in that the camera is placed on a turret of the rotating disk of the roulette cylinder, the camera configured to rotate with the turret.

13. Game device according to claim 7, characterized in that the fifth displaying means comprises a surface configured to display the image transmitted by the processing means.

14. Game device according to claim 13, characterized in that the surface comprises a display or a backlit panel on which an image is included, which represents the rotating disk, so that the trajectory of the image of the ball on the surface is visible by the players.

15. Game device according to claim 7, characterized in that the third means comprises a plurality of sensors placed on the circumference of the cylinder, and an encoder and wherein the fourth processing means is configured to process signals emitted by the sensors to determine the angular distance of the ball from a number "zero" on a numbered box and the linear distance from the centre of the rotating disk.

16. Game device according to claim 7, characterized in that the fourth processing means is equipped with a software configured to:
   detect a numbered box with number "zero";
   rotate the image shot by the third shooting means with respect to a centre of the circumference of the numbers, in order to align the detected "zero" on a top of the bets placement area, thereby replicating the position of a "zero", and of all remaining numbers in the bets placement area.

17. Game device according to claim 7, characterized in that it has a first modification kit comprising:
   the bets placement area includes a representation of the rotating disk;
   the third means, is a camera designed to shoot imagery of the run of the ball inside the roulette cylinder;
   the fourth processing means is configured to process the imagery shot by the camera; and
   the fifth displaying means is configured to display on the bets placement area the processed imagery of the ball.

18. The game device of claim 7 wherein the roulette cylinder, the numbered boxes, and the ball are virtual.

19. The game device of claim 7 wherein the roulette cylinder, the numbered boxes, and the ball are physically real.

* * * * *